V. LINK.
AUTOMOBILE FRAME.
APPLICATION FILED MAR. 27, 1918.
1,326,750.
Patented Dec. 30, 1919.
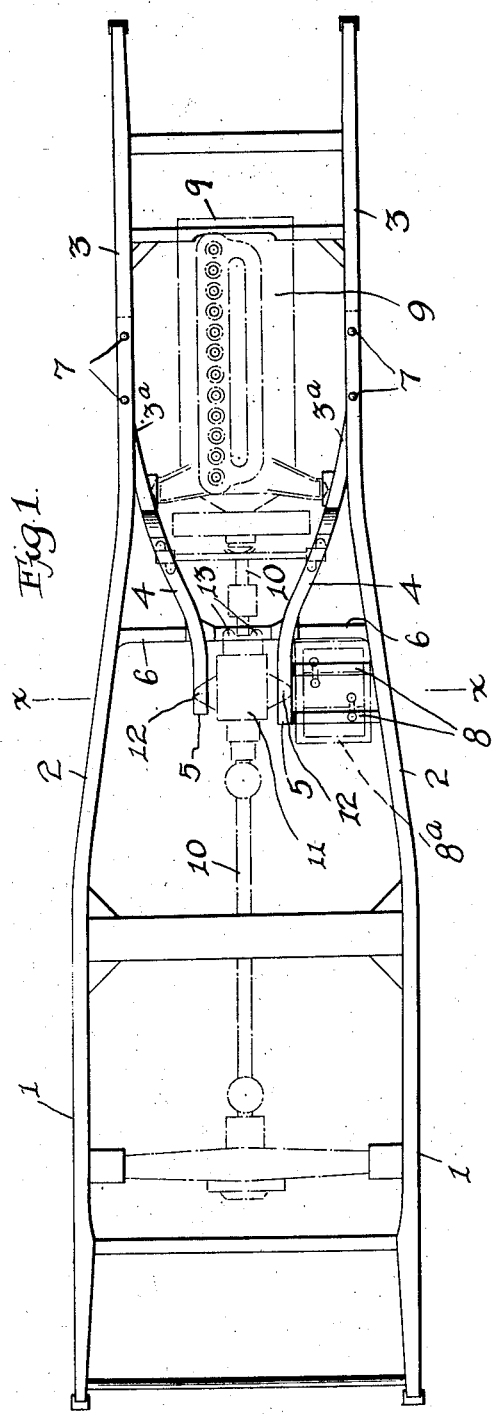
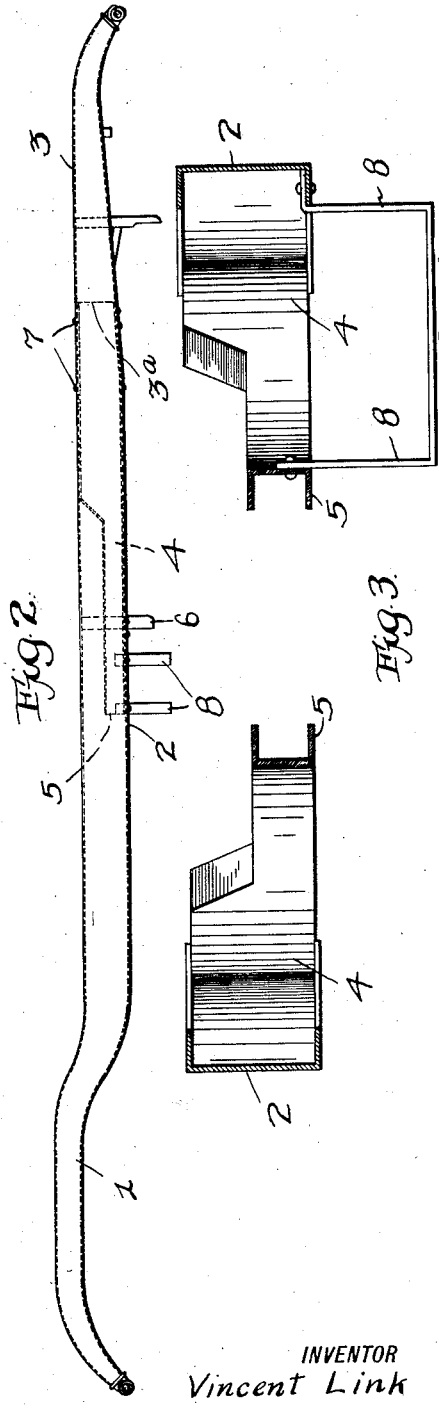
INVENTOR
Vincent Link
BY
Stewart Perry
his ATTORNEYS

UNITED STATES PATENT OFFICE.

VINCENT LINK, OF DETROIT, MICHIGAN, ASSIGNOR TO THE STUDEBAKER CORPORATION, A CORPORATION OF NEW JERSEY.

AUTOMOBILE-FRAME.

1,326,750.  Specification of Letters Patent.  Patented Dec. 30, 1919.

Application filed March 27, 1918. Serial No. 225,057.

*To all whom it may concern:*

Be it known that I, VINCENT LINK, a citizen of the United States of America, and resident of Detroit, in the county of Wayne and State of Michigan, have invented certain new and useful Improvements in Automobile-Frames, of which the following is a specification.

My invention relates to an improvement in automobile frame work construction with the object in view of adding strength and rigidity to such structure, at the same time providing more convenient and substantial supports for the motor, the driving shaft, gear box and auxiliary mechanism.

I have illustrated my invention in the accompanying drawings referring to the parts by numerals, and designating like parts by like numerals.

Figure 1 is a plan view.

Fig. 2 is a side elevation.

Fig. 3 is a vertical section taken approximately on the line $x$—$x$.

What is familiarly known as the bottle shape automobile framework construction is illustrated in Fig. 1 where two side bars substantially in the same plane are parallel at each end thereof and converge centrally. By 1—1 I have indicated the rear section of said bars which are parallel and spaced apart sufficiently to provide a wide platform for the tonneau. The forward sections of said side bars are indicated by 3—3. These in like manner are parallel but in closer proximity than the rear sections for the purpose of allowing abundant room for the steering wheels to swing in the frame, thus making a shorter turning radius. The section of the side bars indicated as 2—2 it will be noted converges from the sections 1—1 to the sections 3—3, thus forming what as stated is known as the bottle shape construction.

I have observed that the weaker section of such a frame is where the side bars converge adjacent the forward section of the frame as forward of the line $x$—$x$, Fig. 1. I deem it desirable therefore to strengthen the frame at this point and to provide a brace against transverse strain as well as a support for the rear end of the motor, the gear box and the driving shaft. It is important that such support should be as rigid and as permanent as possible in order that the alinement of the driving shaft may be maintained uniform and disturbed as little as possible by vibration due to the operation of the mechanism and the movement of the automobile.

To accomplish these objects I have therefore provided the auxiliary frame work which comprehends the two converging bars 4—4 and the cross bar 6. These bars 4—4 are secured respectively to the side bars at 7—7, and thence converge toward the longitudinal axis of the frame and terminate in the parallel sections thereof 5—5. 6 is a cross bar passing under and supporting the members 4—4 secured thereto and to the side bars between the sections 2—2. Swung between one of the converging bars and one of the side bars are the straps 8 adapted to support an electric battery as $8^a$. 9 is a motor supported at the rear end thereof by suitable brackets resting on said converging bars 4 adjacent the point $3^a$. 10 is the driving shaft and 11 the gear box, supported by the wings 12—12 on the ends 5—5 of the converging bars 4—4.

The side bars and the converging bars 4—4 and supporting bars 6 are substantially in the same plane. They are united to form a transverse brace for the frame thus affording rigidity at what probably is the weakest part of the frame and at the same time serving as a convenient means for mounting the motor, gear box, driving shaft and auxiliary mechanism in such relation that they will be rigidly supported and the alinement of the driving shaft will be maintained.

What I claim is:

1. An automobile frame work comprising two side bars having rear and forward sections and intermediate sections converging from the rear to the forward section, a frame work interposed between said side bars comprising two bars secured at one end of each to said forward section of the side bars and of a form to converge toward the axial line of the frame with means to support the free ends of said bars by a brace interposed between the side bars all of said structure lying in substantially the same plane and being united to form a brace between said side bars and a support for the motor, gear box, driving shaft and auxiliary mechanism.

2. In an automobile frame two side bars in combination with two bars mounted between said side bars all being in substantially the same plane, said intermediate bars secured each at one end to one of said side bars adjacent the forward part of said side bars and being of a form to converge from the point at which they are thus secured for a part of their length and then to run parallel, a supporting brace interposed between the side bars and beneath said intermediate bars adjacent the rear ends thereof and secured to both as and for the purposes specified.

3. An auto chassis frame embodying a pair of side members, transverse members for spacing the side members, and, a framework interposed between the side members in the forward part of the frame embodying a pair of bars secured at their forward ends to the inner faces of the side members and of a form to converge rearwardly toward the longitudinal medial line of the frame, said bars being supported near their free ends by one of the transverse members of the frame, whereby said bars are adapted to furnish a rigid support for the rear end of the motor, gear box, drive shaft and auxiliary mechanism.

4. An auto chassis frame embodying a pair of spaced side members, a frame-work interposed between said side members in the forward part of the frame and comprising two bars each of which is secured at its forward end to one of the side members and which bars converge rearwardly toward the longitudinal medial line of the chassis frame, and means for supporting said bars near their free ends by a brace interposed between the side members, all of said structure lying in substantially the same plane and being rigidly united to form a support for the rear end of the motor, the gear box, driving shaft and auxiliary mechanism.

Signed by me at Detroit, Michigan, this 22d day of March, 1918.

VINCENT LINK.

Witnesses:
 Roy C. Gamble,
 William MacGlashan.